United States Patent [19]
Yoshida

[11] Patent Number: 5,214,619
[45] Date of Patent: May 25, 1993

[54] SUPERSONIC SOUND EMISSION DEVICE
[75] Inventor: Hajime Yoshida, Tokyo, Japan
[73] Assignee: Hajime Industries Ltd., Tokyo, Japan
[21] Appl. No.: 738,344
[22] Filed: Jul. 31, 1991
[51] Int. Cl.$^5$ ............................................... H04B 1/02
[52] U.S. Cl. ................................... 367/139; 367/140; 310/334; 116/22 A
[58] Field of Search ....................... 367/137, 139, 140; 116/22 A; 310/317, 334

[56]        References Cited
        U.S. PATENT DOCUMENTS

| | | | |
|---|---|---|---|
| 4,566,085 | 1/1986 | Weinberg | 116/22 A |
| 4,656,770 | 4/1987 | Nuttle | 116/22 A |
| 4,730,190 | 3/1988 | Win et al. | 342/118 |
| 4,882,525 | 11/1989 | DeMealenaer et al. | 310/316 |
| 4,905,270 | 2/1990 | Ono | 379/58 |
| 4,965,552 | 10/1990 | Price et al. | 367/139 |
| 4,999,818 | 3/1991 | Malleolo | 367/139 |

Primary Examiner—J. Woodrow Eldred
Attorney, Agent, or Firm—Bauer & Schaffer

[57]    ABSTRACT

A supersonic sound emitting device consisting of a power source, a supersonic wave signal generator supplied with a power from the power source and for generating a supersonic wave signal and a supersonic sound emitter supplied with the supersonic wave signal from the supersonic wave signal generator and for emitting a supersonic sound, wherein the power source has a solar battery, a secondary battery charged by the solar battery, and an on-off switcher for making the secondary battery on and off.

10 Claims, 2 Drawing Sheets

SUPERSONIC SOUND EMISSION DEVICE

BACKGROUND OF THE INVENTION

1. Field of the Invention

The present invention relates generally to a supersonic sound emission device and, more particularly, to a supersonic sound emission device that prevents birds or other animals species from causing damage.

2. Description of the Prior Art

Various means are in existence, which prevent birds and similar animals from causing direct or indirect damage to humans and other animals and property. Unattended prevention methods against damage caused by the bird species such as sparrows, crows, or pigeons have been known. Such devices as "scarecrows" drive away the birds and are placed in scattered installations in rice patties or the like. There are other ways to drive off the birds such as the mounting of multiple "wooden clappers", which generate a noise by wind movement. It is also noted that drive-off devices using large explosive sounds such as those made by firecrackers are in existence.

An unpleasant sanitation problem results from the droppings of pigeons, which form their nests under house eaves. In order to prevent this problem, the inhabitants have hung, about their homes, paper blankets or the like, which contain drawings such as a "huge eye".

Another problem has arisen from the proliferation of power cables. An increase of accidents have been caused by the birds' alighting on the power cables.

The effectiveness of the conventional "scarecrow" or "huge eye" devices depend upon appeal to the birds' vision or to their sense of hearing in order to generate sufficient impression signifying vigilance or terror. Thus, with such devices, the birds are prevented from even approaching such locations.

However, none of these means present a complete solution, while some cannot even be practiced due to site location. Accordingly, the provision of effective means that do not require special conditions for adaptation to various locations and which can be easily installed have been long awaited.

It is an easy task to present a unit that merely emits supersonic sounds. However, there are various problems in order to present an effective dispersing device for birds.

First, there is the problem of power source for the device. Power supply from a commercial electric power source may be considered, but it carries the limitation that the commercial electric power source must first exist in the vicinity. When the situs of the device is near a house, it is no problem, but when the device is far from any commercial electrical power source, a long cable becomes necessary. This is not only troublesome but is also dangerous. On the other, should batteries be used, the continuous cost to replace the batteries is expensive, and even in the case where rechargeable secondary batteries are used, frequent charging requires excessive care and cost.

OBJECTS AND SUMMARY OF THE INVENTION

Accordingly, it is an object of the present invention to provide a novel supersonic sound emission device that overcomes such above-described problems.

According to an aspect of the present invention, there is provided a supersonic sound emitting device, which consists of a power source, a supersonic wave signal generator, supplied with power from an in situ power source, for generating a supersonic wave signal, and a supersonic sound emitter supplied with the supersonic wave signal from the supersonic wave signal generator for emitting a supersonic sound. The supersonic sound emitting device is characterized in that the power source comprises a solar battery, a secondary battery charged by the solar battery, and an on-off switch for making the secondary battery on and off.

According to another aspect of the present invention, there is provided a supersonic sound emitting apparatus comprising:

a) a supersonic sound emitting device which consists of a power source, a supersonic wave signal generator, supplied with power from said power source, for generating a supersonic wave signal, and a supersonic sound emitter, supplied with the supersonic wave signal from the supersonic wave signal generator, for emitting a supersonic sound. The power source has a solar battery, a secondary battery charged by the solar battery, and an on-off switching means for making the secondary battery on and off; and b) a box in which the supersonic sound emitting device is installed, and on which the solar battery is located so as to receive sunlight directly.

The above and other objects, features, and advantages of the present invention will become apparent from the following detailed description of an illustrative embodiments thereof to be read in conjunction with the accompanying drawings, in which like reference numerals are used to identify the same or similar parts in the several views.

BRIEF DESCRIPTION OF THE DRAWINGS

Briefly, the present invention utilizes the extremely sharp hearing sense of bird species to supersonic sounds. Thus, by driving a supersonic sound emitter by a supersonic wave signal transmitter, a supersonic sound is broadcast, providing discomfort to the bird species so as to chase them off. Since the effectiveness of the supersonic sound depends upon the frequency relative to the bird type, a simple frequency adjuster may be incorporated to make selection of the proper frequency easy. Generally, it is said that supersonic sounds with frequencies between 20–60 Kilo Hertz are adequate to chase off most species of bird. It is noted that bird species have extremely sharp sensibility to supersonic sounds, compared to human beings, as above stated, so that although the sound volume to be emitted may be small, the above purpose is more than sufficiently accomplished. Contrariwise, since the human ear does not sense supersonic sounds, there is no fear of damage to the human ear caused by those sounds.

Further, since the device of the present invention will be mainly used outdoors, there is the problem of power source supply for the device. Therefore, a solar battery charged by the light from the sun is incorporated as part of the device to charge a secondary battery supplying the power to the device.

Figure 1:
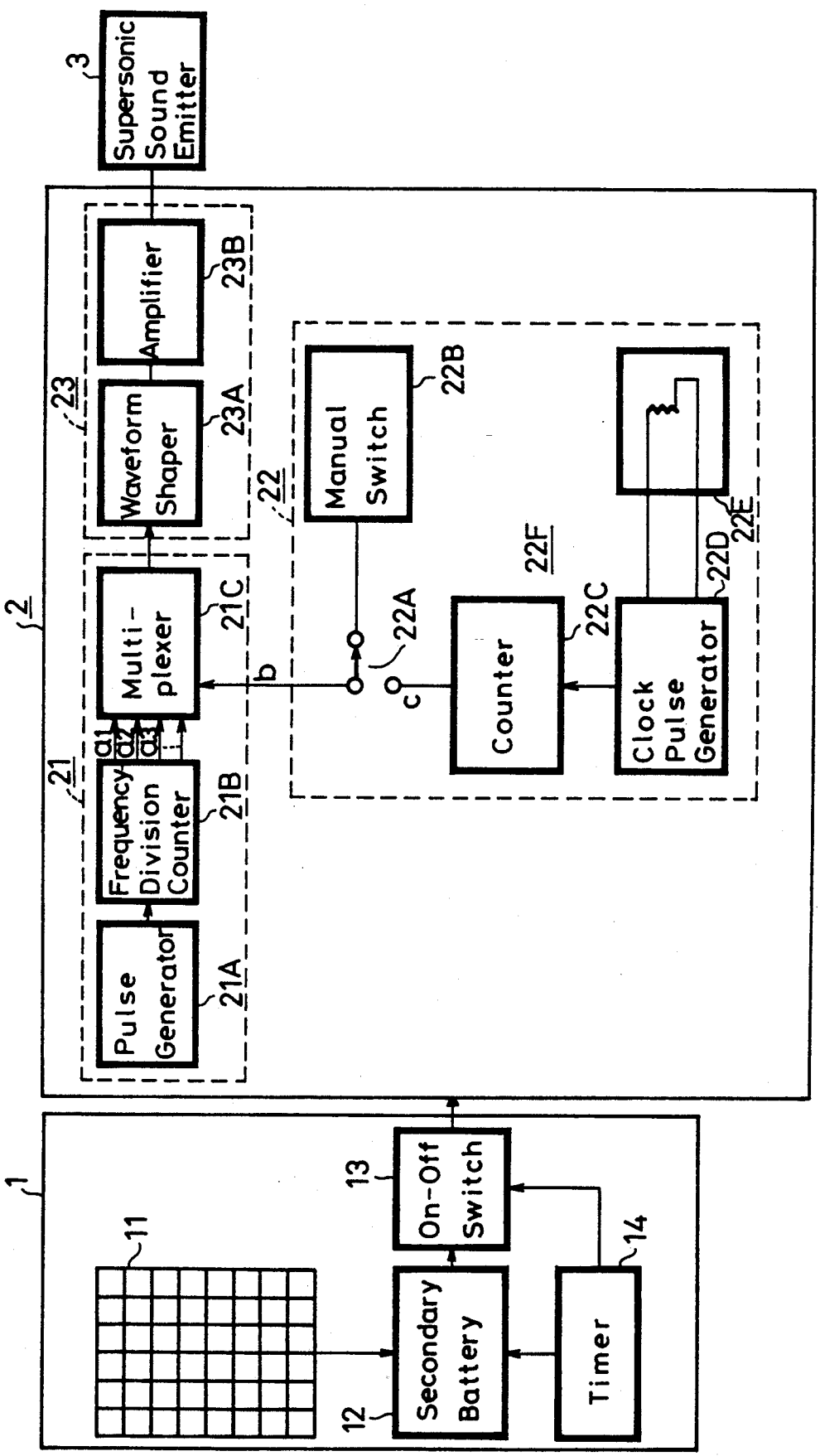
FIG. 1 is a block diagram of the circuit showing an embodiment of the present invention.

Now then, the device as seen in FIG. 1 comprises a power source section 1, a supersonic wave signal generator or transmitter section 2, and a supersonic sound emitter 3. The power source section 1 includes a solar battery 11, a secondary battery 12, an on-off switch 13, and a timer 14.

The electrical energy that is generated by the solar battery 11 as it receives the sun's rays is accumulated in the secondary battery 12. The electrical power accumulated in the secondary battery 12 is supplied to the transmitter section 2 through the on-off switch 13. The periodicity of the on-off switch 13 is controlled by the timer 14. The timer 14 sets the on-off time span of the on-off switch 13 so as to minimize the power consumption of the power source in order to prevent the condition in which the secondary battery 12 is consumed by the circuit load. For example, the on-off switch 13 is alternately 30 minutes on and 15 minutes off. On the other hand, it may be left on only during the daytime and it may be shut off during the night time.

The supersonic wave generator or transmitter section 2 is composed of a supersonic wave signal transmitter 21, a frequency control unit 22, and an amplification unit 23.

The supersonic wave signal transmitter 21 is composed of a pulse generator 21A, a frequency-division counter 21B and a multiplexer 21C. The pulse generator 21A generates a pulse that has a frequency of about more than 60 KHz when the power is supplied thereto from the power source section 1. The frequency-division counter 21B receives the high frequency pulse from the pulse generator 21A, frequency-divides the same, and generates a plurality of pulses a1, a2, a3, ... that are different in frequency, one from another, in a range between, for example, about 20 and 60 KHz. These pulses a1, a2, a3, ... are supplied to the digital multiplexer 21C (herein called a multiplexer) which works as a data selector. The selection of a pulse of a given frequency from the supplied pulses a1, a2, a3, etc. is controlled by the frequency control unit 22.

The frequency control unit 22 is composed of a manual/automatic switch 22A which for manual control is provided with a manual switch 22B and for automatic control is provided with an automatic frequency converter 22F which includes a counter 22C, a clock pulse generator 22D, and its adjuster 22E which is manually operated. A switch 22A is interposed between the manual switch 22B and counter 22C.

When the switch 22A is switched to the manual switch 22B, the multiplexer 21C determines the selection of one pulse from among the different frequency pulses a1, a2, a3, etc. that are output from the frequency-division counter 21B. A signal b is supplied to the multiplexer 21C from the frequency control unit 22 in order to select one from among the pulses a1, a2, a3, etc. Since this signal must be a digital signal of binary scale, the manual switch 22B must be a digital switch.

On the other hand, the pulse that is selected by the multiplexer 21C may be automatically changed periodically. At such time, the switch 22A connects the digital counter 22C to the multiplexer 21C. The digital counter 22C steps to the count of the clock pulse with predetermined periodicity generated by the pulse generator 22D to consecutively generate different binary digital signals at the output side C of the counter 22C. By supplying such consecutively generated signals to the multiplexer 21C via the switch 22A, the high frequency pulse selected by the multiplexer 21C is consecutively changed. By the manual adjustment of the adjuster 22E, comprising, for example, a variable resistor connected to the pulse generator 22D, the period of the pulse generated from the pulse generator 22D can be set up at a desired value.

In the foregoing manner, the multiplexer 21C conducts the selection of a certain frequency pulse, or automatically selects certain ones of the high frequency pulses a1, a2, a3, ... at a constant period. The pulsated electrical output from multiplexer 21C is sent to an amplifier unit 23 at which it is amplified and thereafter supplied to a sound emitter 3 from which a supersonic sound with a frequency that responds to the pulse frequency is emitted.

The amplifier unit 23 consists of a waveform shaper 23A and an amplifier 23B. The waveform shaper 23A supplies a high frequency wave signal that enables the sound emitter 3 to release a sound of an adequate tone to the amplifier 23B by waveform shaping of the high frequency pulse that is sent from the multiplexer 21C by such use of a low-pass filter or the like. The amplifier 23B is a power amplifier unit capable of amplifying such high frequency signals as is supplied from the waveform shaper 23A and is enabled to sufficiently drive the sound emitter 3. Thus, the sound emitter 3 will release the predetermined supersonic sound as driven by the signal power from the amplifier 23B.

Figure 2A:
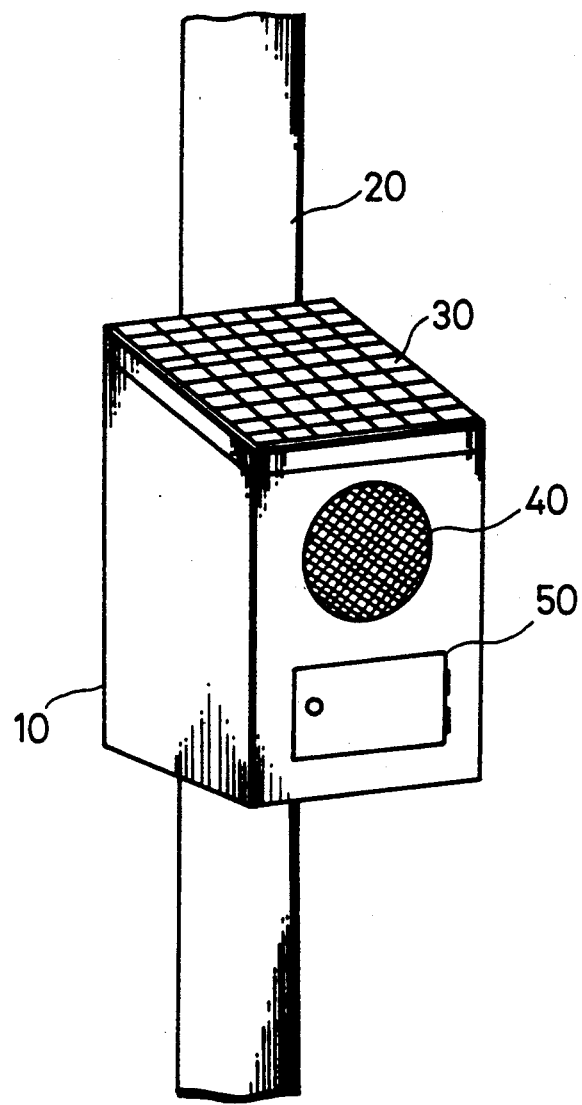
FIGS. 2A and 2B are perspective and side views, respectively, of a box in which an embodiment of the present is contained in practical use.
Figure 2B:
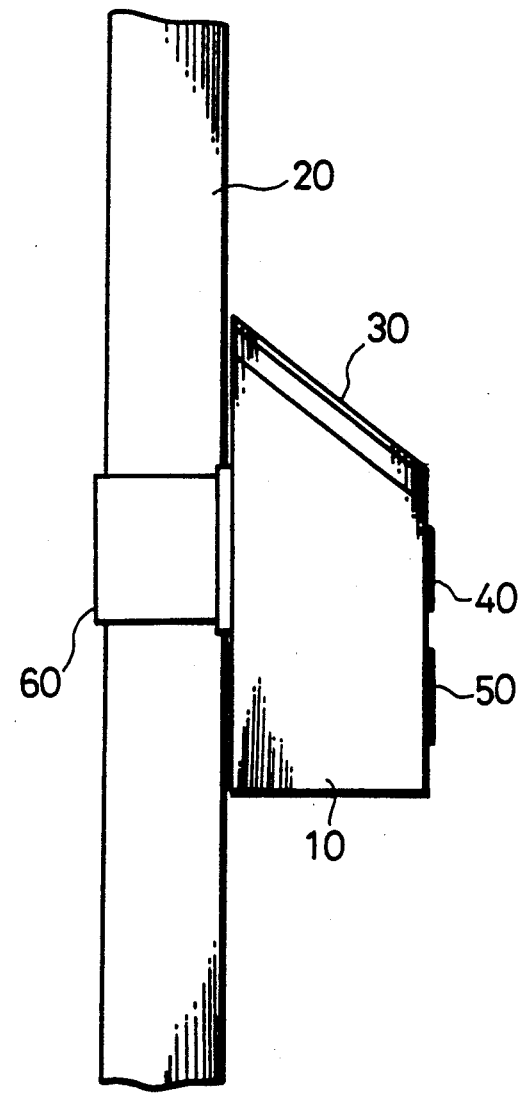

FIGS. 2A and 2B are perspective and side views of a case where the device according to the present invention is enclosed in a single box which is mounted on a fixture such as a pillar or the like. In FIGS. 2A and 2B, 10 is a box, 20 is a pillar onto which the box 10 is mounted, 30 is a solar battery (the same as the solar battery 11 on FIG. 1), 40 is a sound releasing window through which the supersonic sound emitted from sound emitter 3 within the box 10 is emitted to the outside, 50 is an opening door on the box 10, and 60 is a fitting by which the box 10 is mounted on the pillar 20.

Since the structure is simple, detailed explanations of its use are not necessary. The door 50 is a window which, when opened, permits manipulation of the manual/automatic switch 22A, as explained in FIG. 1, or the hand switch 22B or adjuster 22E. Further, the fitting 60 may be conventional, being selected depending upon the mounting location of box 10, and can be prepared in advance.

Also, in order to use the device of the present invention outdoors, the emitter may be of a type having a large sound emission. However, it may be more efficient to scatter a multiple number of low output devices. By making a standard device, a scatter installation may be easily provided in an open space.

Since the device of the invention will be mainly used outdoors, it is needless to say that the entire device be of a rainproof structure. The shape or design need not be bound by FIG. 2 and can, of course, be freely modified. The interior circuit structure may also be designed with other circuit logics so long as the objects of the present invention are not lost.

It should be understood that the above description is presented by way of example on the preferred embodiments of the invention, and it will be apparent that many modifications and variations thereof could be effected by one with ordinary skill in the art without departing from the spirit and scope of the novel concepts of the invention so that the scope of the invention should be determined only by the appended claims.

I claim as my invention:

1. A supersonic sound emitting device which consists of a power source, a supersonic wave signal generator supplied with power from said power source and generating a supersonic wave signal and a supersonic sound emitter supplied with the supersonic wave signal from said supersonic wave signal generator for emitting a supersonic sound, said super sound emitting device being characterized in that said power source includes a solar battery, a secondary battery charged by said solar battery, and an on-off switching means connected between said secondary battery and said supersonic wave signal generator, a timer for controlling an on-off time span of said on-off switching means so as to make said secondary battery on and off and frequency control means for controlling the frequency of the supersonic wave signal generated from said supersonic wave signal generator.

2. The supersonic sound emitting device as claims in claim 1, wherein said timer controls said secondary batter itself such that said secondary battery is repeatedly made on during a first predetermined time period and then made off during a second predetermined time period so as to minimize power consumption of said secondary battery during the operation of said device.

3. The supersonic sound emitting device as claimed in claim 1, wherein said supersonic wave signal generator includes a pulse generator generating a pulse with a predetermined frequency, a frequency-dividing counter supplied with said pulse and generating a plurality of pulses different in frequency, and a selector supplied with said plurality of pulses and selecting one of said plurality of pulses under the control of said frequency control means.

4. The supersonic sound emitting device as claimed in claim 1, wherein said frequency control means includes a manual switch, an automatic frequency converter, and manual to automatic switch means, said manual to automatic switch means being arranged to connect said supersonic wave signal generator to said manual switch and said automatic frequency converter.

5. The supersonic sound emitting device as claimed in claim 4, where said automatic frequency converter comprises a clock pulse generator for generating a clock pulse with a predetermined frequency and a counter supplied with said clock pulse to sequentially generate different binary signals which are supplied to said manual to automatic switcher.

6. The supersonic sound emitting device as claimed in claim 5, wherein said automatic frequency converter includes an adjuster connected to said clock pulse generator to adjust the frequency of said clock pulse.

7. The supersonic sound emitting apparatus comprising:
a) a supersonic sound emitting device which consists of a power source, a supersonic wave signal generator supplied with power from said power source for generating a supersonic wave signal and a supersonic sound emitter supplied with the supersonic wave signal from said supersonic wave signal generator and for emitting a supersonic sound, said power source having a solar battery, a secondary battery charged by said solar battery an on-off switching means and a timer for controlling the on-off time span of said on-off switching means so as to make said secondary battery on and off for a predetermined period; and
b) a box in which said supersonic sound emitting device is installed and on which said solar battery is located so as to receive sunlight directly.

8. The supersonic sound emitting apparatus as claimed in claim 7, wherein said box has a window permitting the emission of the supersonic sound from said supersonic sound emitter.

9. The supersonic sound emitting apparatus as claimed in claim 8, wherein said box includes a door opening used so as to permit manual adjustment of said supersonic sound emitting device.

10. The supersonic sound emitting apparatus as claimed in claim 7, including means for varying the frequency of the supersonic wave signal periodically.

* * * * *